United States Patent
Hironaga

(10) Patent No.: US 6,320,150 B1
(45) Date of Patent: Nov. 20, 2001

(54) WIRE ELECTRIC DISCHARGE MACHINING APPARATUS, WIRE ELECTRIC DISCHARGE MACHINING METHOD, AND MOLD FOR EXTRUSION

(75) Inventor: Masayuki Hironaga, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/351,582

(22) Filed: Jul. 12, 1999

(30) Foreign Application Priority Data

Jul. 16, 1998 (JP) .................................................. 10-202025

(51) Int. Cl.$^7$ ...................................................... B23H 1/00
(52) U.S. Cl. ..................................... 219/69.12; 219/69.11; 219/69.16
(58) Field of Search ............................. 219/69.12, 69.14, 219/69.11, 69.18, 69.16; 204/224 M

(56) References Cited

U.S. PATENT DOCUMENTS

| | | | |
|---|---|---|---|
| 4,527,035 | * | 7/1985 | Majestic .............................. 219/69 W |
| 5,408,063 | * | 4/1995 | Onishi ............................... 219/69.14 |

FOREIGN PATENT DOCUMENTS

| | | |
|---|---|---|
| 0 743 122 A2 | 11/1996 | (EP) . |
| 56-152531 | 11/1981 | (JP) . |
| 62-110816 | 7/1987 | (JP) . |
| 1-222821 | 9/1989 | (JP) . |

\* cited by examiner

Primary Examiner—M. Alexandra Elve
(74) Attorney, Agent, or Firm—Burr & Brown

(57) ABSTRACT

Disclosed is a wire electric discharge machining apparatus comprising a wire-driving system for feeding a wire electrode while opposing it to a workpiece, and a power supply unit for supplying electric power to the wire electrode, wherein electric discharge is effected between the wire electrode and the workpiece to machine the workpiece to have an arbitrary shape. The wire electrode is allowed to approach the workpiece to effect the electric discharge between the wire electrode and the workpiece so that the workpiece is machined to have an arbitrary shape, while a suction mechanism is used to remove undesirable matters including sludge together with a working fluid via cylindrical members from holes formed in the workpiece. Accordingly, it is possible to easily form, by means of wire electric discharge machining, a machining groove having a narrow width and a large depth under a condition deviated from the general standard machining condition for the wire electric discharge machining, for example, even for a workpiece having a large thickness.

6 Claims, 10 Drawing Sheets

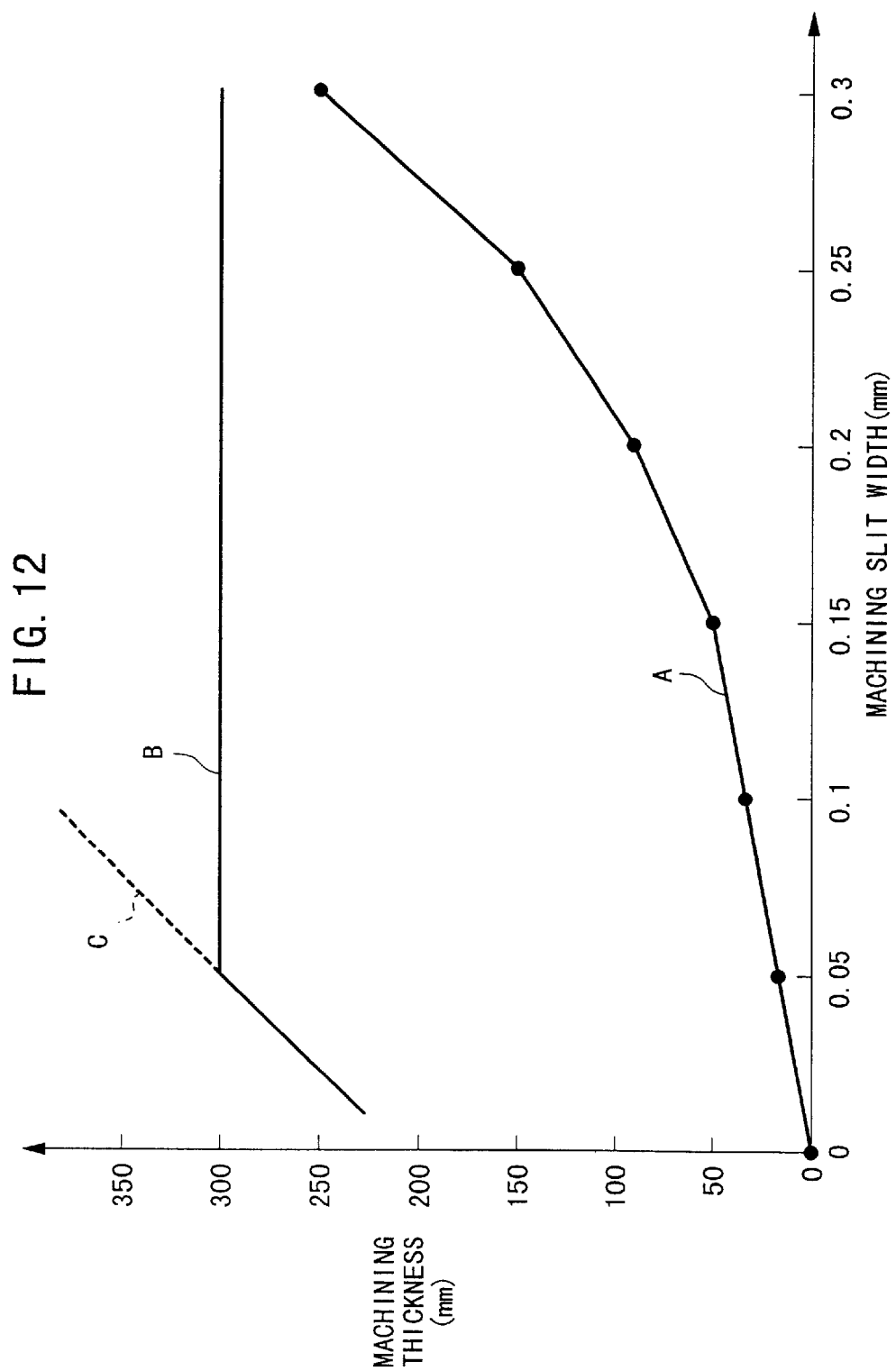

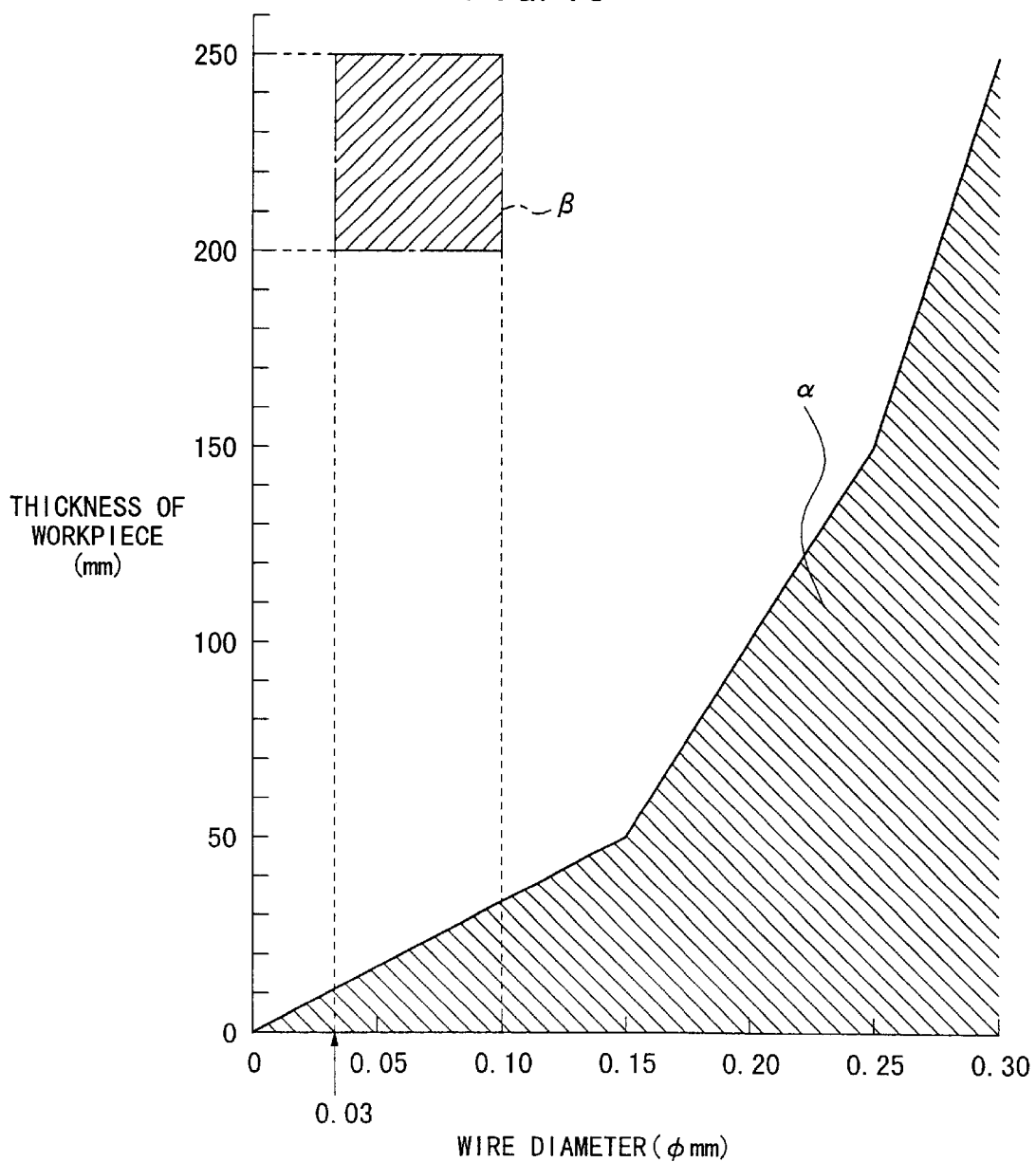

WIRE ELECTRIC DISCHARGE MACHINING APPARATUS, WIRE ELECTRIC DISCHARGE MACHINING METHOD, AND MOLD FOR EXTRUSION

BACKGROUND OF THE INVENTION

1. Field of the Invention

The present invention relates to a wire electric discharge machining apparatus and a wire electric discharge machining method for effecting electric discharge between a wire electrode and a workpiece to machine the workpiece to have an arbitrary shape. The present invention also relates to a mold for extrusion produced by the wire electric discharge machining apparatus and the wire electric discharge machining method.

2. Description of the Related Art

In general, in wire electric discharge machining, which is one of the cutting machining procedures based on the use of a thin wire electrode, the discharge phenomenon is allowed to occur between the wire electrode and the workpiece. Therefore, wire electric discharge machining is advantageous in that the machining can be performed irrelevant to the characteristic values of a material such as the strength, the hardness, and the toughness of the workpiece. Further, wire electric discharge machining has the following advantages.

(1) The nonflammable working fluid other than oil can be effectively utilized.

(2) The electrode can be used in a disposable manner.

(3) The fatigue of the electrode does not greatly affect the machining accuracy.

(4) The CNC (computer numerical control) function can be sufficiently utilized.

Further, in wire electric discharge machining, a relatively small mechanical force is exerted on the workpiece during the machining. Therefore, wire electric discharge machining is also advantageous to machine thin workpieces, those having a fragile quality, and those having fine shapes such as extremely small holes and slits.

In order to improve the electric discharge efficiency in the travelling direction of the machining and improve the machining speed in the wire electric discharge machining described above, it is desirable to efficiently discharge undesirable matters such as sludge (machining powder), bubbles, and working fluid having lowered specific resistance generated in a minute gap as a machining gap between the wire electrode and the workpiece.

For this purpose, a method is available in which the fluid pressure of the working fluid to be jetted to the machining gap is increased. However, the increased fluid pressure makes a factor to give any vibration to the wire electrode. Therefore, this method involves drawbacks such as the decrease in machining accuracy, the generation of bubbles, and the fear of contact between the wire electrode and the workpiece to electrically form a short circuit resulting in electrode breakage.

A method has been hitherto suggested, in which the wire electric discharge machining is performed while efficiently discharging the sludge or the like by using a wire electrode having a specified shape. For example, Japanese Laid-Open Patent Publication No. 56-152531 describes the use of a wire provided with grooves, projections, and irregularities on its surface to discharge the sludge or the like. Japanese Laid-Open Utility Model Publication No. 62-110816 describes the use of a wire having a triangular, rectangular, or elliptic cross-sectional configuration so that the wire is rotated and fed to discharge the sludge or the like. Japanese Laid-Open Patent Publication No. 1-222821 describes the use of a wire having a straight angle cross section formed to give a helical configuration to discharge the sludge or the like.

In general, as shown in FIG. 13, wire electric discharge machining involves a standard machinable range which is the range $\alpha$ indicated by hatched lines. If the condition is deviated from this range, the following problems occur. That is, it is impossible to perform the machining to give a desired shape, the breaking of wire occurs, and the machining groove width is abnormally enlarged. For example, it is assumed that a machining groove having a width of 0.05 mm to 0.12 mm is intended to be formed on a workpiece having a thickness of 200 mm to 250 mm. This condition lies in a range $\beta$ indicated by dashed lines in FIG. 13, which is a condition far apart from the standard machining condition.

The machining, which is performed under a condition as described above, is exemplified by the formation of a mold for producing, by extrusion, honeycomb ceramics which is used, for example, for a catalyst for automobiles, especially, for example, the formation of a slit for defining the opening width of the cell of the honeycomb ceramics.

In such a case, the electric discharge machining can be performed with a prescribed machining groove at the early stage of the electric discharge machining. However, when the machining groove is deep, the sludge or the like tends to accumulate between the wire electrode and the machining groove. It is feared that any unstable electric discharge such as a secondary electric discharge may occur on account of the sludge to cause the enlargement of the machining groove width and the breaking of the wire electrode.

The purpose of the conventional method described above is that electric discharge machining is well performed persistently under the standard machining condition. The conventional method does not assume any electric discharge machining under conditions deviated from the standard machining condition as described above, because of the following reason. That is, the conventional method uses the wire having the specified shape from the early stage of the electric discharge machining (in which the standard machining condition is almost satisfied). Therefore, it is inevitable that the machining groove width is widened, which is not suitable to form the slit for defining the opening width of the cell of the honeycomb ceramics as described above.

Further, it is necessary to use a special power supply system directed to the wire electrode. Therefore, it is inevitable to change the arrangement of the wire electric discharge machining apparatus to a great extent. As a result, it is feared that the production cost may be increased.

SUMMARY OF THE INVENTION

The present invention has been made taking the foregoing problems into consideration, an object of which is to provide a wire electric discharge machining apparatus and a wire electric discharge machining method which make it possible to easily form, by means of the wire electric discharge machining, a machining groove having a narrow width and a large depth under a condition deviated from the general standard machining condition for wire electric discharge machining, for example, for a workpiece having a large thickness, and which make it possible to produce, for example, a slit for defining the opening width of a cell of honeycomb ceramics exactly as designed.

Another object of the present invention is to provide a mold for extrusion, which makes it possible to easily produce, for example, honeycomb ceramics having a thin partition wall by means of extrusion.

According to the present invention, there is provided a wire electric discharge machining apparatus comprising a wire-driving system for feeding a wire electrode while opposing the wire electrode to a workpiece, and a power supply unit for supplying electric power to the wire electrode, wherein electric discharge is effected between the wire electrode and the workpiece to machine the workpiece to have an arbitrary shape. The wire electric discharge machining apparatus further comprises a suction mechanism connected to a plurality of holes communicating with machining grooves to be formed on the workpiece by the wire electrode, for removing undesirable matters including sludge from the machining grooves via the plurality of holes.

Accordingly, it is possible to remove the undesirable matters such as sludge, bubbles, and working fluid having lowered specific resistance generated by the electric discharge machining. Thus, it is possible to avoid any factors such as a secondary electric discharge which would otherwise result in an enlargement of the machining groove.

Therefore, it is possible to easily form, by means of wire electric discharge machining, a machining groove having a narrow width and a large depth under a condition deviated from the general standard machining condition for wire electric discharge machining, for example, even for a workpiece having a large thickness. Thus, it is possible to produce a slit for defining the opening width of a cell of a honeycomb ceramic exactly as designed.

In this aspect, it is also preferable that the wire electric discharge machining apparatus further comprises a machining tank for storing a working fluid to immerse the workpiece therein, or a working fluid supply mechanism for supplying a working fluid to an electric discharge machining site on the workpiece or vicinity thereof, wherein the suction mechanism removes the undesirable matters together with the working fluid. This arrangement is preferred in that the undesirable matters can be removed while applying the electric discharge machining in a state in which the electric discharge machining site of the workpiece is immersed in the working fluid.

It is also preferable for the wire electric discharge machining apparatus constructed as described above that the suction mechanism includes a plurality of cylindrical members for being inserted into the plurality of holes, and a holding member for holding the plurality of cylindrical members.

According to another aspect of the present invention, there is provided a wire electric discharge machining method comprising the steps of feeding a wire electrode by using a wire-driving system while opposing the wire electrode to a workpiece, and supplying electric power to the wire electrode by using a power supply unit so that electric discharge is effected between the wire electrode and the workpiece to machine the workpiece to have an arbitrary shape. The workpiece is machined while employing a suction mechanism to remove undesirable matters, including sludge, through a plurality of holes that communicate with machining grooves to be formed on the workpiece by the wire electrode.

Accordingly, it is possible to remove by suction the undesirable matters generated by the electric discharge machining. Thus, it is possible to avoid any factor such as secondary electric discharge which would otherwise result in the enlargement of the machining groove.

When the spacing distance between the plurality of holes communicating with the machining grooves is decreased, it is possible to easily form, by means of wire electric discharge machining, a machining groove having a narrow width and a large depth by using the wire electrode having a small diameter under a condition deviated from the general standard machining condition for the wire electric discharge machining, for example, even for a workpiece having a large thickness. Thus, it is possible to produce a slit for defining the opening width of a cell of a honeycomb ceramic exactly as designed.

In this arrangement, it is preferable that the undesirable matters are removed by using the suction mechanism together with a working fluid in which an electric discharge machining site on the workpiece is immersed. By doing so, the undesirable matters can be preferably removed while applying the electric discharge.

In still another aspect of the present invention, there is provided a mold for extrusion comprising a large number of slits formed in a lattice-shaped configuration through its front surface, and a large number of body-introducing holes provided on a side of its back surface for supplying a body to the large number of slits, wherein the large number of slits are formed by wire electric discharge machining while removing by means of suction through the body-introducing holes, undesirable matters including sludge generated during the wire electric discharge machining.

That is, the machining groove is formed by wire electric discharge machining while removing the undesirable matters generated during the wire electric discharge machining. Therefore, it is possible to easily form, by means of wire electric discharge machining, a machining groove having a narrow width and a large depth under a condition deviated from the general standard machining condition for wire electric discharge machining, for example, a mold having a large thickness.

In this arrangement, the slit of the mold is formed by using wire electric discharge machining. Therefore, for example, when a honeycomb ceramic having a thin partition wall is produced by using the extrusion mold according to the present invention, it is possible to easily produce the honeycomb ceramic in which the opening width of the cell is extremely small, and the conformation of the cell is not deteriorated.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 12 shows a range achievable by the wire electric discharge machining according to the embodiment of the present invention; and FIG. 13 shows the characteristic illustrating the standard machining condition for the wire electric discharge machining.

DESCRIPTION OF THE PREFERRED EMBODIMENTS

Figure 1:
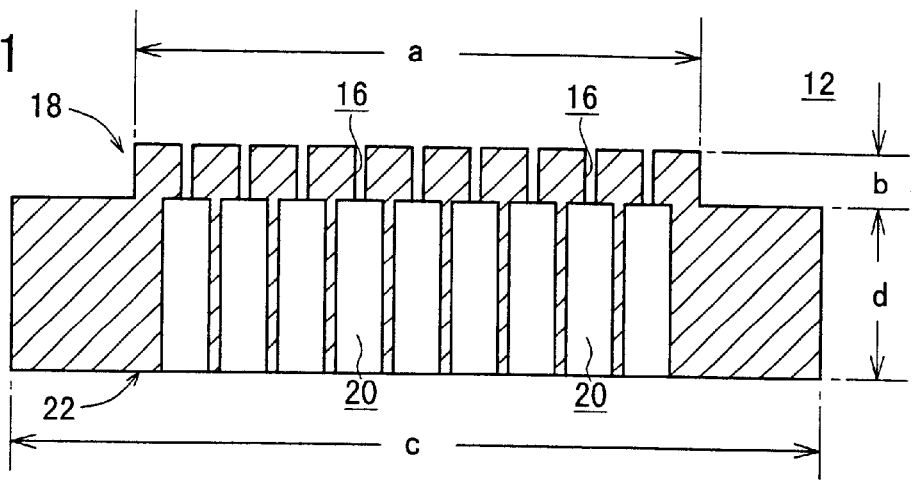
FIG. 1 shows a longitudinal sectional view illustrating a mold for extrusion produced by a wire electric discharge machining apparatus according to an embodiment of the present invention.
Figure 2:
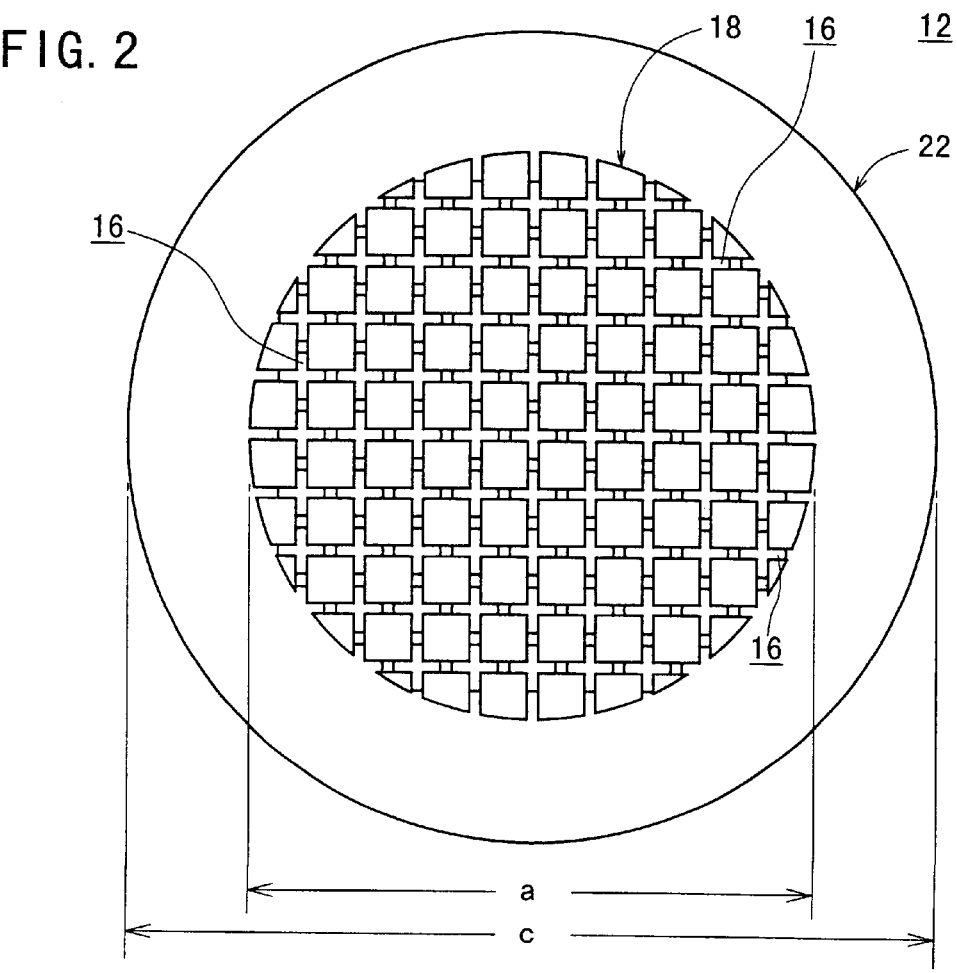
FIG. 2 shows a plan view illustrating the mold for extrusion according to the embodiment of the present invention.
Figure 3:
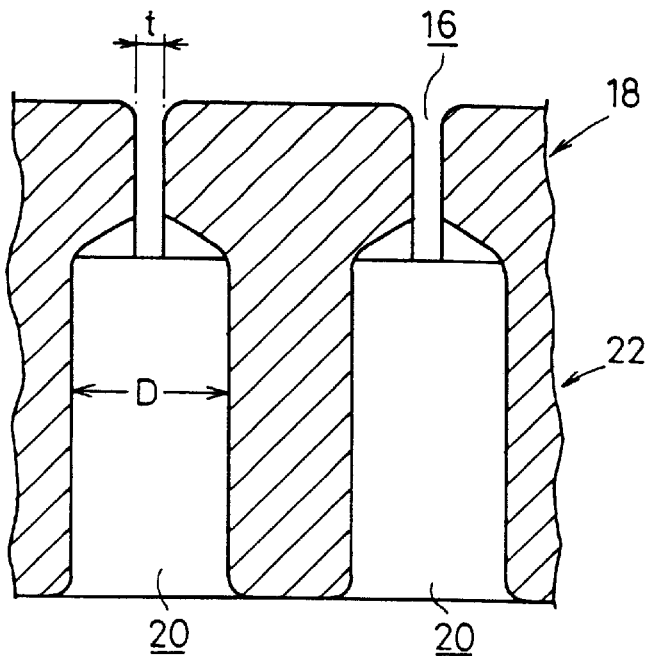
FIG. 3 shows a longitudinal sectional view illustrating, with partial magnification, the mold for extrusion according to the embodiment of the present invention.
Figure 4:
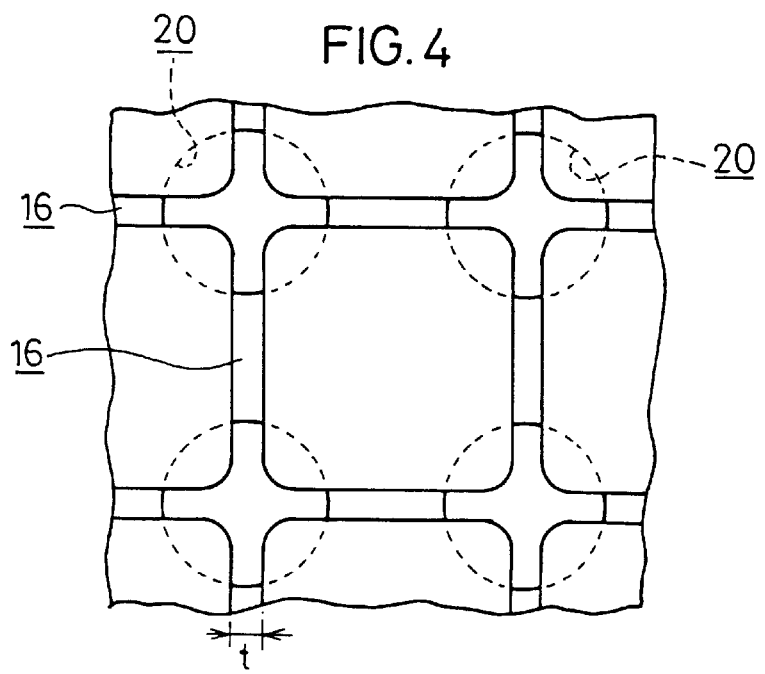
FIG. 4 shows a plan view illustrating, with partial magnification, the mold for extrusion according to the embodiment of the present invention.

Explanation will be made below with reference to FIGS. 1 to 11 for an illustrative embodiment in which the wire electric discharge machining apparatus according to the present invention is applied, for example, to a mold for producing, by extrusion, honeycomb ceramics to be used for an automobile catalyst, especially to a case in which a slit is formed to define the opening width of the cell of the honeycomb ceramic (hereinafter simply referred to as the "wire electric discharge machining apparatus according to the embodiment").

At first, before explaining the wire electric discharge machining apparatus 10 according to the embodiment of the present invention, explanation will be made with reference to FIGS. 1 to 5 for the mold 12 for extrusion produced by the wire electric discharge machining apparatus 10 and the honeycomb ceramic 14 produced by the extrusion.

As shown in FIGS. 1 to 4, the extrusion mold 12 comprises a slit section 18 including a large number of slits (machining grooves) 16 formed in a lattice-shaped configuration (see FIG. 4) through its front surface, and a body-introducing section 22 including a large number of body-introducing holes 20 formed on the side of its back surface for supplying the body to the large number of slits 16 of the slit section 18.

The respective body-introducing holes 20 of the body-introducing section 22 are formed by means of drill machining. The respective slits 16 of the slit section 18 are formed by means of wire electric discharge machining as described later on so that they have, for example, a depth of 5 mm.

Figure 6:
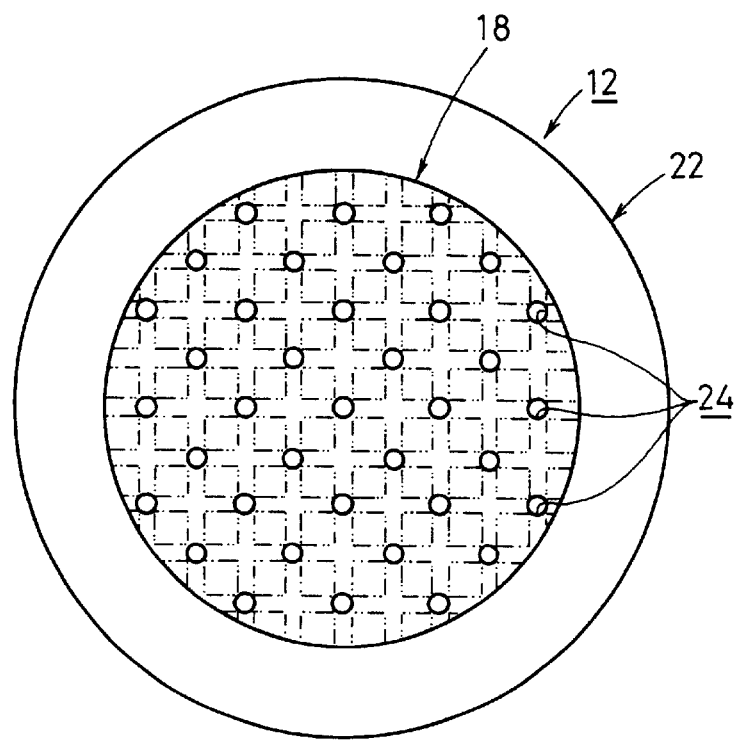
FIG. 6 shows a plan view illustrating the mold for extrusion before being machined by a wire electric discharge machining method according to the embodiment of the present invention.
Figure 7:
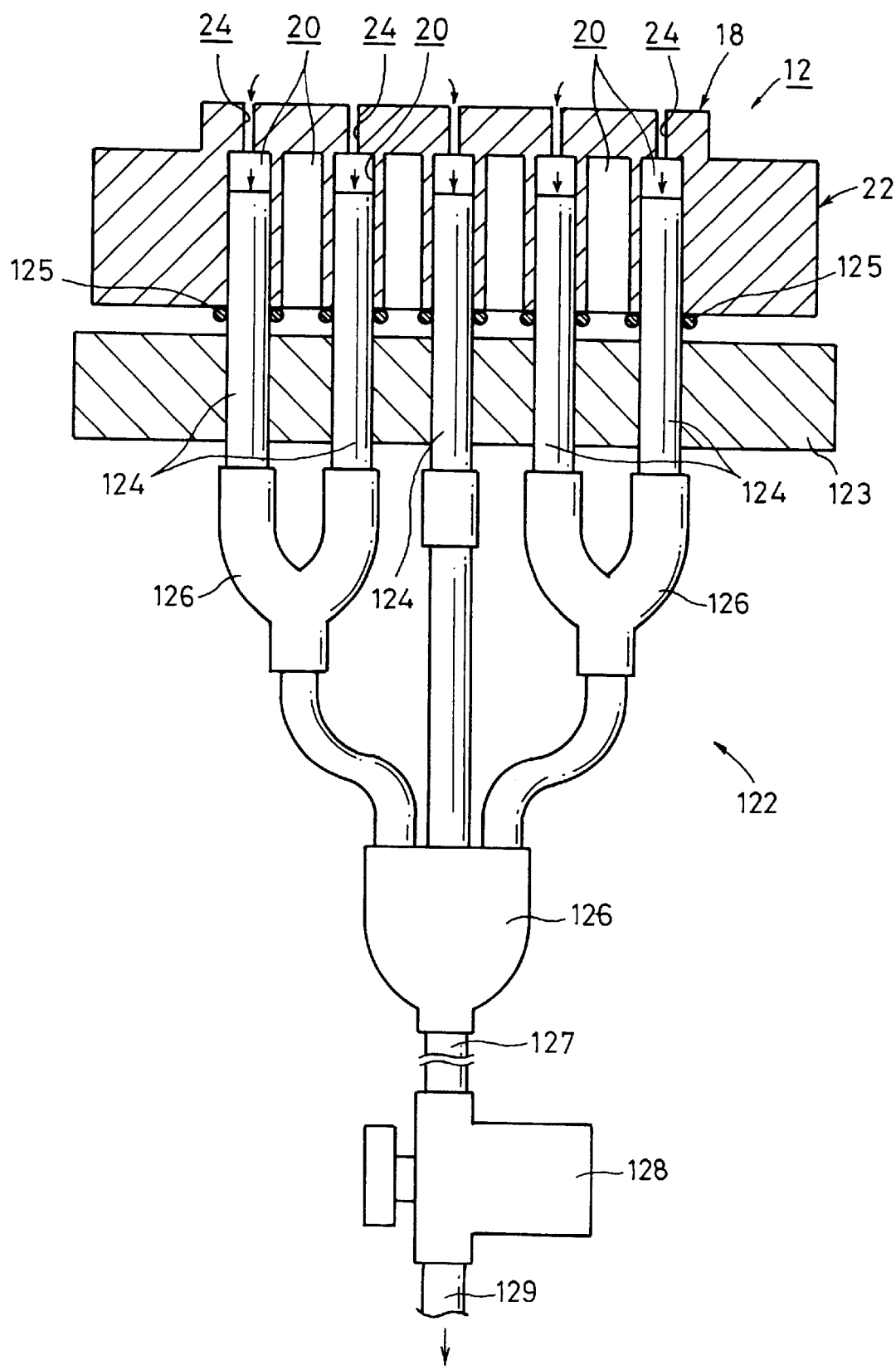
FIG. 7 schematically illustrates, with partial cross section, a suction mechanism to be used for the wire electric discharge machining apparatus according to the embodiment of the present invention.

As shown in FIGS. 6 and 7, a plurality of holes 24 each having, for example, a diameter of 100 μm to 200 μm are previously formed, for example, by means of electric discharge machining on the slit section 18 of the extrusion mold 12 before the slits 16 are formed.

The holes 24 communicate with the body-introducing holes 20 from positions corresponding to points of intersection of the respective slits 16. The diameter of the hole 24 is formed to be the same as the width t of the slit 16 or to be slightly smaller than the width t of the slit 16 (see FIG. 3). It is unnecessary to form the holes 24 at all of the positions corresponding to the points of intersection of the slits 16. The holes 24 may be formed, for example, on every second intersection depending on the width of slit 16.

Figure 5:
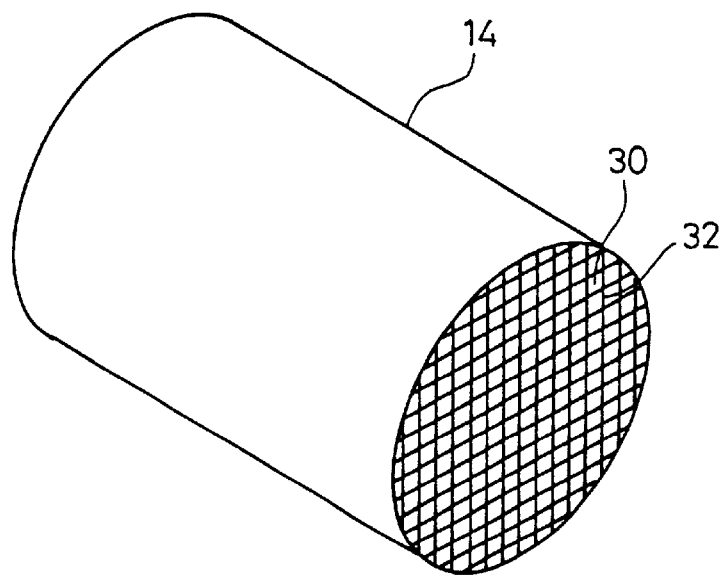
FIG. 5 shows a perspective view illustrating an arrangement of honeycomb ceramics produced by using the mold for extrusion according to the embodiment of the present invention.

The honeycomb ceramic 14 shown in FIG. 5 is formed by using the extrusion mold 12. Thus, the thickness of the partition wall 32 of each of the cells 30 of the honeycomb ceramic 14 is substantially coincident with the width t of the slit 16, and it can be formed to be extremely thin.

Therefore, a catalyst carrier, which is obtained by sintering the honeycomb ceramic 14, can be also formed to have an extremely thin thickness of the partition wall 32 between the cells 30. Accordingly, a catalyst carrier that is light in weight can be used for cleaning the exhaust gas discharged from the automobile. Further, the temperature can be raised for a short period of time when the engine is started. Therefore, it is possible to clean the exhaust gas without any trouble.

Next, explanation will be made with reference to FIGS. 7 to 9 for the wire electric discharge machining apparatus 10 according to the embodiment of the present invention which makes it possible to form the extremely thin partition wall 32 between the respective cells 30 of the honeycomb ceramic 14.

Figure 8:
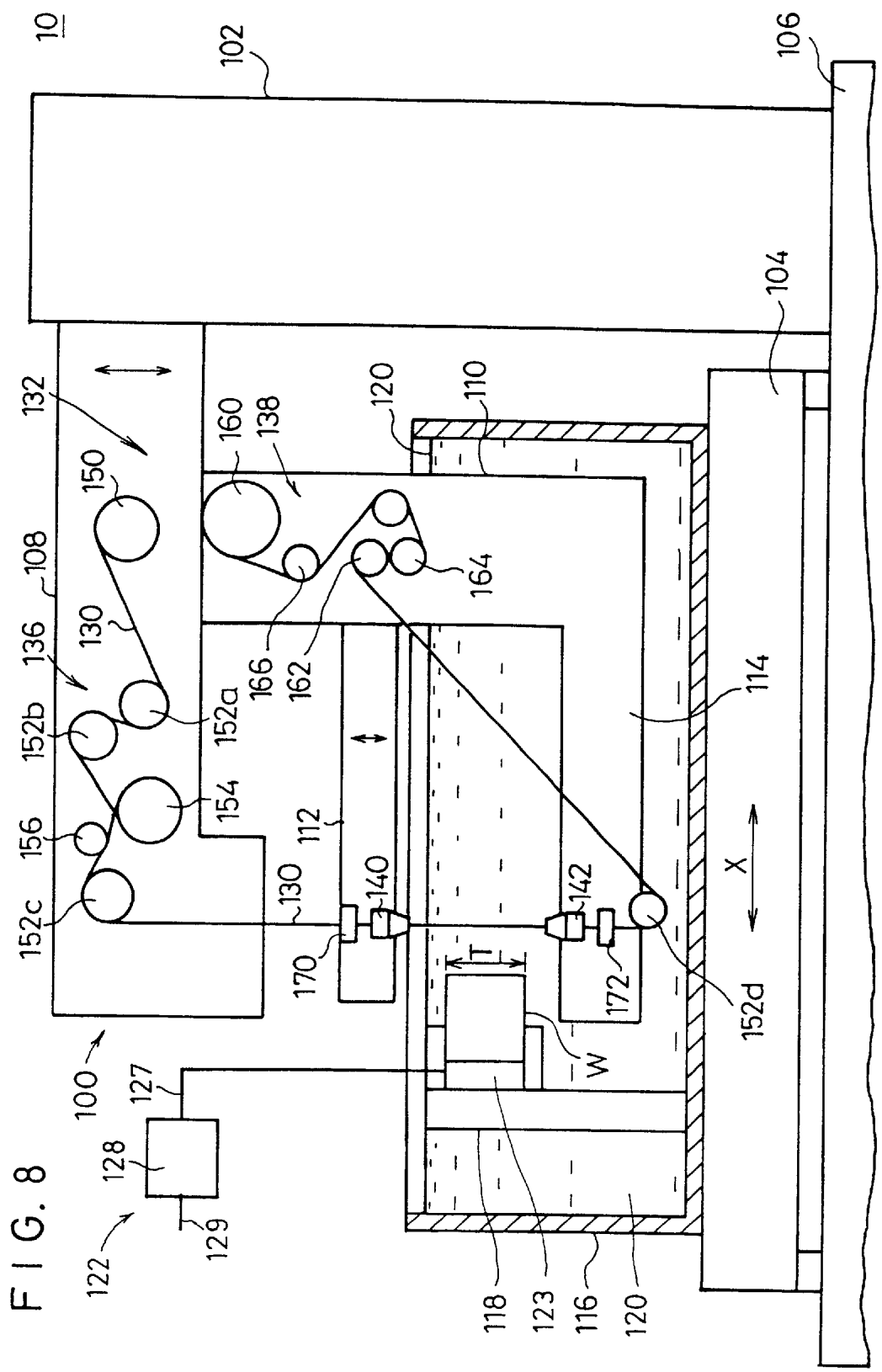
FIG. 8 shows a side view illustrating, with partial breakage, the wire electric discharge machining apparatus according to the embodiment of the present invention.
Figure 9:
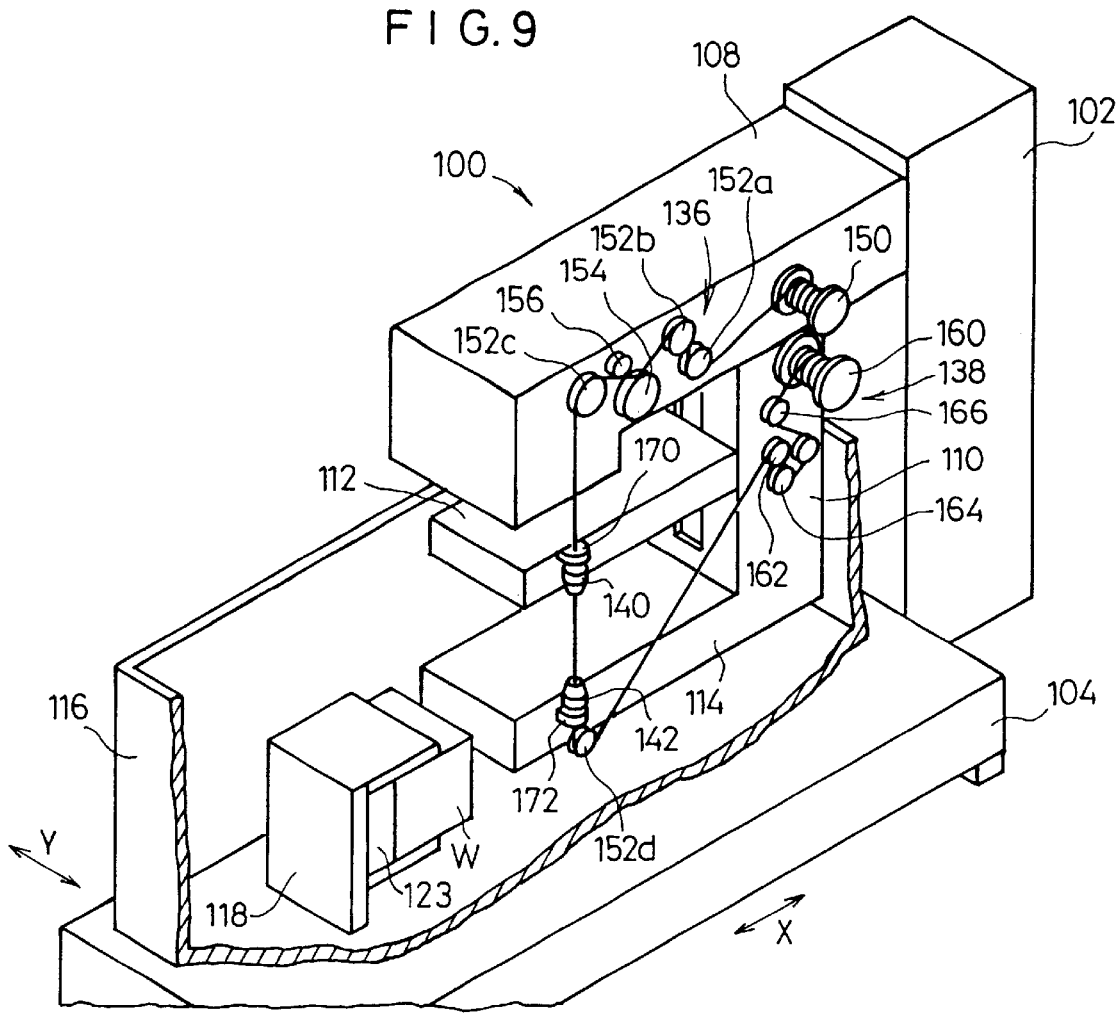
FIG. 9 shows a perspective view illustrating the wire electric discharge machining apparatus according to the embodiment of the present invention.

As shown in FIGS. 8 and 9, the wire electric discharge machining apparatus 10 comprises a column 102 on which a main apparatus body 100 of the wire electric discharge machining apparatus 10 is attached, and an XY table 104 for moving the workpiece W together with a machining tank 116 as described later on in the horizontal direction (XY direction). The column 102 and the XY table 104 are placed on the upper surface of a base pedestal 106.

The main apparatus body 100 includes an upper arm 108 which extends in the horizontal direction from an upper portion of the column 102 to a position over the XY table 104 and which is movable in the axial direction of the column 102 by the aid of an unillustrated first movement drive mechanism, and a lower arm 110 which extends downwardly from a lower surface portion of the upper arm 108 near to the column 102.

An upper support plate 112, which extends in parallel to the upper arm 108 and which is movable in the axial direction of the lower arm 110 by the aid of an unillustrated second movement drive mechanism, is provided on the upper front surface (portion close to the upper arm 108) of the lower arm 110. A lower support plate 114, which extends in parallel to the upper arm 108, is integrally provided at the lower front surface (portion close to the XY table 104) of the lower arm 110.

A machining tank 116 is fixed on the upper surface of the XY table 104. A workpiece-holding mechanism 118 for holding and fixing the workpiece W is attached in the machining tank 116. A working fluid (for example, ion-exchanged water having an electrical resistivity of not less than $10^3$ Ω·cm) is poured into the machining tank 116 to immerse the entire workpiece W held and fixed by the workpiece-holding mechanism 118.

Figure 10:
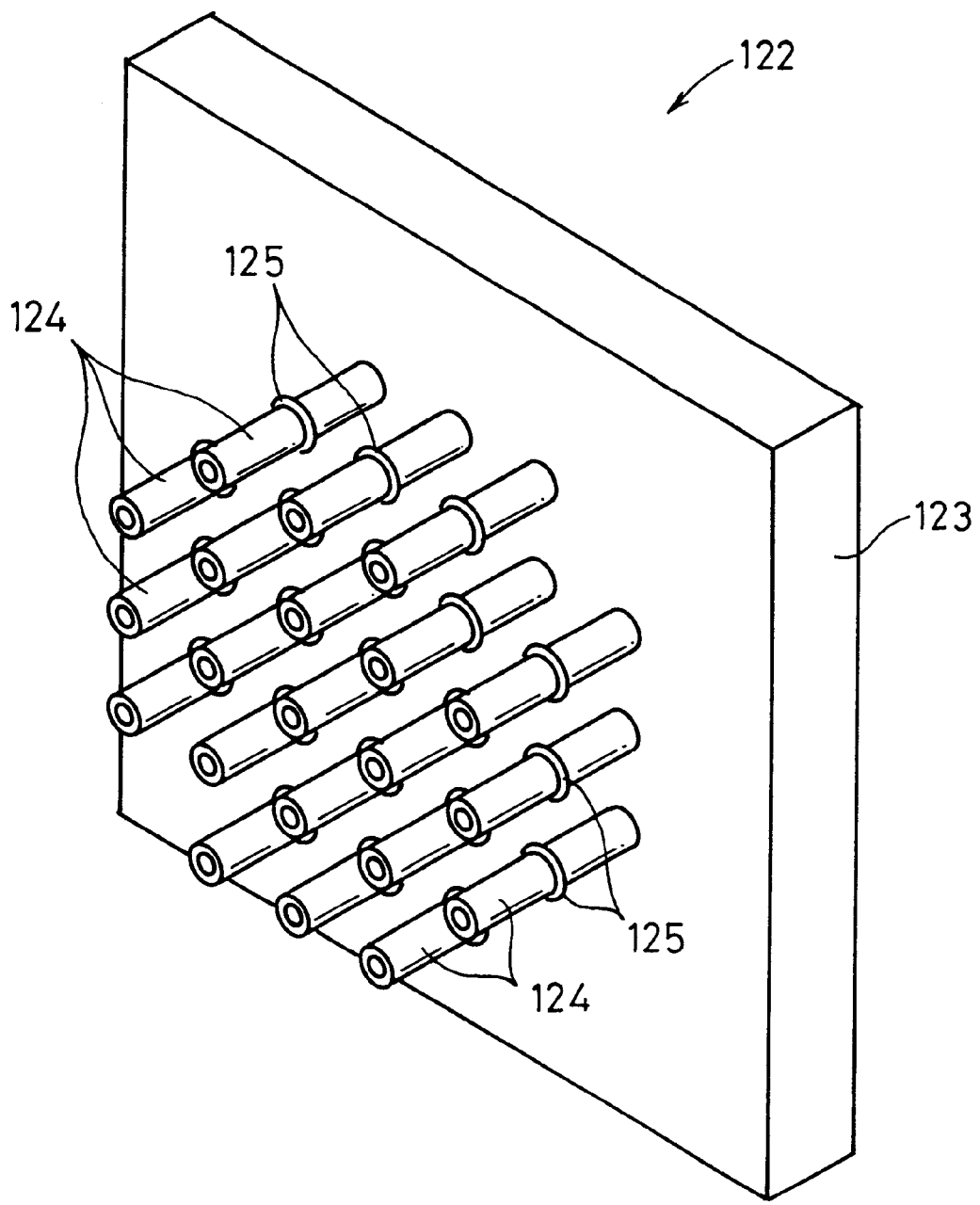
FIG. 10 shows a holding member to be used for the wire electric discharge machining apparatus according to the embodiment of the present invention.

The workpiece-holding mechanism 118 is provided with a holding member 123 for constructing a suction mechanism 122. As shown in FIG. 10 a plurality of cylindrical members 124 are formed to stand on the holding member 123. As shown in FIG. 7, each of the cylindrical members 124 is inserted into the body-introducing hole 20 of the extrusion mold 12 as the workpiece W. A ring-shaped packing member 125, which is made of a material such as rubber, is attached to the cylindrical member 124.

The plurality of cylindrical members 124 are connected to a single tube 127 via a plurality of distributive joints 126. The tube 127 is connected to a pump 128. A discharge port 129 is provided for the pump 128.

The wire electric discharge machining apparatus 10 according to this embodiment is provided with a wire-driving system 132 (shown in FIG. 8) for feeding a wire electrode 130 while opposing it to the workpiece W, the wire electrode 130 being made of, for example, copper, Cu—Zn, or tungsten, and an upper power supply unit 170 and a lower power supply unit 172 for supplying the electric power to the wire electrode 130.

The wire-driving system 132 comprises a wire supply section 136 provided on a side surface of the upper arm 108, and a wire-winding section 138 provided on a side surface of the lower arm 110. The upper power supply unit 170 is provided on an end side surface portion of the upper support plate 112. The lower power supply unit 172 is provided on an end side surface portion of the lower support plate 114.

The wire supply section 136 comprises a wire supply bobbin 150 with a large number of turns of the linear wire electrode 130 wound therearound, first to third pulleys 152a to 152c for introducing, to the upper power supply unit 170, the wire electrode 130 led from the wire supply bobbin 150, a brake roller 154 provided between the second and third pulleys 152b, 152c for controlling the feed speed of the wire electrode 130, and a wire holder 156 provided between the brake roller 154 and the third pulley 152c for applying the load to the wire electrode 130 to adjust the tension of the wire electrode 130.

The wire-winding section 138 comprises a wire-winding bobbin 160 for winding the used wire electrode 130 (wire electrode 130 led through the lower power supply unit 172) completed for the electric discharge machining for the workpiece W, a fourth pulley 152d provided in the vicinity of an end lower surface portion of the lower support plate 114, a wire-winding roller 162 for leading the used wire electrode 130 toward the lower arm 110 by being guided by the fourth pulley 152d, a pinch roller 164 for transporting, to the wire-winding bobbin 160, the used wire electrode 130 wound by the wire-winding roller 162, and a wire-aligning/winding unit 166 for aligning and winding the used wire electrode 130 around the wire-winding bobbin 160.

The upper support plate 112 is provided with an upper nozzle 140 for jetting the working fluid 120 downwardly along the feed direction of the wire electrode 130 in order to cool the machining portion processed by the wire electric discharge machining. The lower support plate 114 is also provided with a lower nozzle 142 for jetting the working fluid 120 upwardly along the feed direction of the wire electrode 130 in order to cool the machining portion processed by the wire electric discharge machining.

The wire electric discharge machining apparatus 10 is used as follows. At first, in order to attach the workpiece W to the workpiece-holding mechanism 118 installed in the machining tank 116, the upper arm 108 is moved upwardly by the aid of the unillustrated first movement drive mechanism. After that, the workpiece W is installed to the holding member 123 of the suction mechanism 122 (see FIG. 7) to be held by the workpiece-holding mechanism 118. Accordingly, the holes 24 communicate with the pump 128 via the cylindrical members 124. After that, the working fluid 120 is poured into the machining tank 116 until the workpiece W is immersed therein.

Subsequently, the upper arm 108 is moved downwardly by the aid of the unillustrated first movement drive mechanism, and then the upper support plate 112 is moved upwardly or downwardly corresponding to the thickness T of the workpiece W by the aid of the unillustrated second movement drive mechanism.

Figure 11:
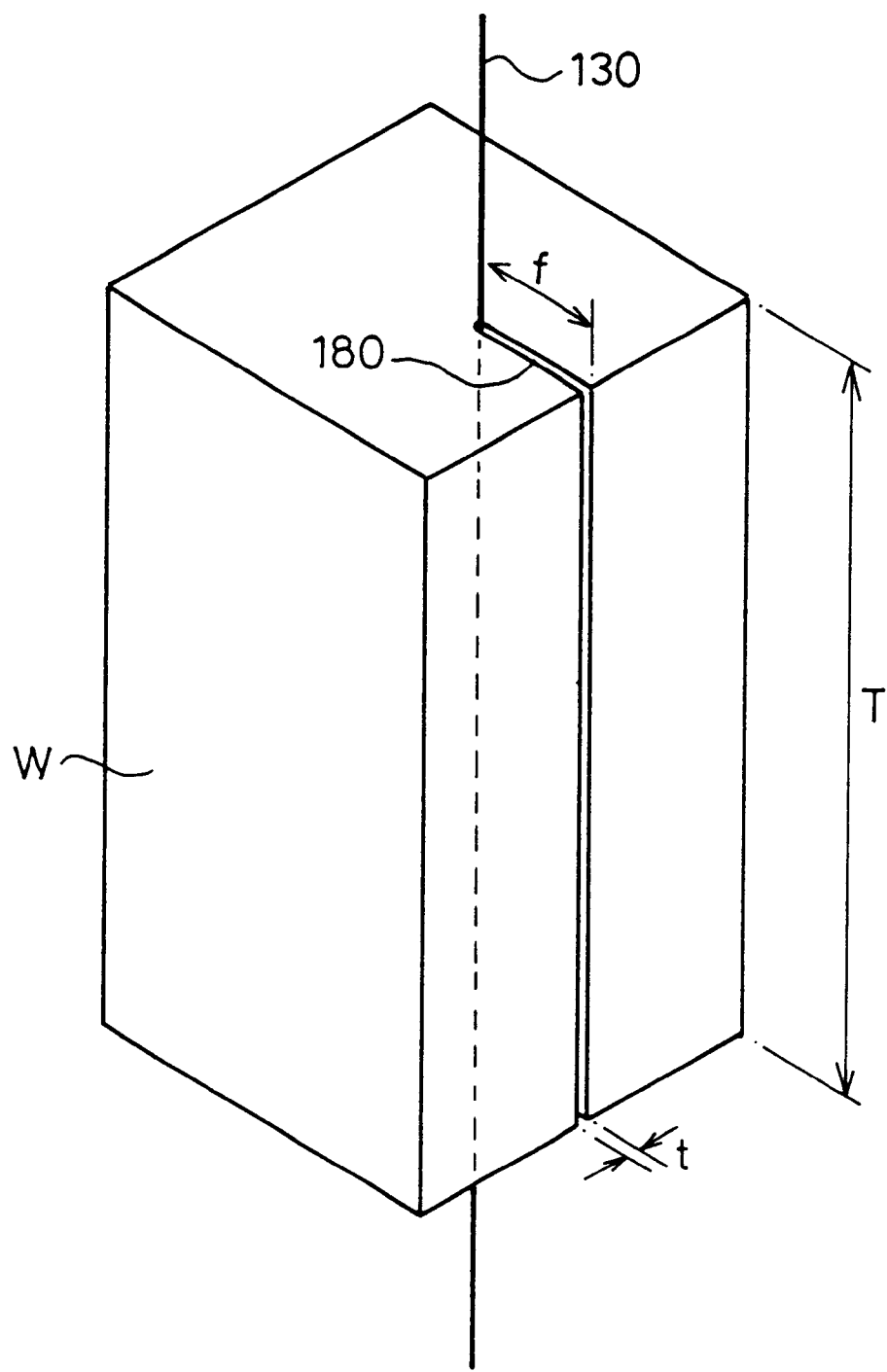
FIG. 11 shows a perspective view illustrating a shape of a machining groove formed on a workpiece by means of the electric discharge machining.

After that, the machining tank 116 is moved by driving the XY table 104 so that the workpiece W held by the workpiece-holding mechanism 118 approaches the wire electrode 130 while feeding the wire electrode 130 from the wire supply bobbin 150. The electric discharge is started from the stage at which the wire electrode 130 subjected to the feed process is opposed to the workpiece W and it closely approaches the workpiece W. As shown in FIG. 11, the machining groove 180 is formed by the electric discharge on the workpiece W until the depth is equal to the depth of the hole 24.

During this process, the pump 128 is operated, and the working fluid 120, in which the workpiece W is immersed, is removed by the pump 128 from the holes 24 communicating with the machining groove 180, via the body-introducing holes 20 and the cylindrical members 124 (see FIGS. 7 and 8). Accordingly, undesirable matters including sludge, which are generated between the machining groove 180 and the wire electrode 130 during the electric discharge machining, are removed together with the working fluid 120 to avoid any factor such as secondary electric discharge which would otherwise result in an enlargement of the machining groove 180. Further, it is possible to decrease the possibility of breaking the wire electrode 130 as well.

A problem has been pointed out in that when any vibration occurs in the wire electrode 130 during the electric discharge machining, the width t of the machining groove 180 is increased due to the vibration. However, in the present invention, it is possible to suppress the vibration of the wire electrode 130 in the machining groove 180, for example, owing to the flow of the working fluid 120 subjected to the suction. Accordingly, it is possible to form a smaller width t of the machining groove 180. Further, it is unnecessary to apply a large tension to the wire electrode 130 to suppress the vibration. The tension applied to the wire electrode 130 can be decreased. Thus, it is possible to further decrease the possibility of breaking the wire electrode 130.

Therefore, it is possible to easily form, by means of wire electric discharge machining, the machining groove 180 having a narrow width t and a large depth f under a condition deviated from the general standard machining condition for wire electric discharge machining, for example, even for a workpiece W having a large thickness T. Especially, undesirable matters such as sludge can be efficiently removed by decreasing the spacing distance between the holes 24. Therefore, wire electric discharge machining can be performed even when the thickness T of the workpiece W is large, or even when the width t of the machining groove 180 is narrow.

As shown in FIG. 12, the wire electric discharge machining apparatus 10 according to the embodiment of the present invention makes it possible to form the machining groove up to a range which is far apart from the range specified by an upper limit indicated by the solid line A, i.e., up to a range specified by an upper limit indicated by the solid line B. For example, it is possible to form a machining groove 180 having a machining slit width t of 0.02 to 0.05 mm for a machining thickness T of 220 mm to 300 mm.

In FIG. 12, the maximum value of the machining thickness T is 300 mm, because the stroke of the wire electric discharge machining apparatus 10 is 300 mm. However, it is clear that if the limitation resulting from the stroke is eliminated, the machining can be effected up to a range specified by an upper limit indicated by a broken line C depicted along an extension line of the solid line B.

Accordingly, it is possible to produce, for example, the slit 16 for defining the opening width of the cell 30 of the honeycomb ceramic 14 exactly as designed, of the extrusion mold 12 shown in FIG. 1.

Therefore, a catalyst carrier, which is obtained by sintering the honeycomb ceramic 14, can be also formed to have an extremely thin thickness of the partition wall 32 between the cells 30. Accordingly, a catalyst carrier that is light in weight and can be used for cleaning the exhaust gas discharged from the automobile. Further, the temperature can be raised for a short period of time when the engine is started. It is possible to clean the exhaust gas without any trouble.

Further, it is possible to omit the plating step which has been hitherto performed after the formation of the slit 16 in order to narrow the width of the slit 16. Thus, it is possible to simplify the production steps.

Especially, in the embodiment of the present invention, it is sufficient to install the suction mechanism 122 to the workpiece W. The wire electric discharge machining apparatus 10 according to the embodiment of the present invention can be constructed merely by applying the simple change in design to the wire electric discharge machining apparatus which has been hitherto used.

For example, this results in that the production cost of the honeycomb ceramic 14 is reduced, and it is possible to realize, with the simple arrangement, the wire electric discharge machining apparatus 10 which makes it possible to perform electric discharge machining under the condition exceeding the standard machining condition, stably and highly accurately. Therefore, it is possible to further facilitate the popularization of wire electric discharge machining.

In the embodiment of the present invention, wire electric discharge machining is performed by immersing the workpiece W in the working fluid 120 stored in the machining tank 116. Alternatively, wire electric discharge machining may be performed while supplying the working fluid 120 to the machining site of the workpiece W by using an unillustrated working fluid supply mechanism.

It is a matter of course that the wire electric discharge machining apparatus, the wire electric discharge machining method, and the mold for extrusion according to the present invention are not limited to the embodiments described above, which may be embodied in other various forms without deviating from the gist or essential characteristics of the present invention.

What is claimed is:

1. A wire electric discharge machining apparatus comprising:

a wire-driving system for feeding a wire electrode while opposing said wire electrode to a workpiece;

a power supply unit for supplying electric power to said wire electrode, wherein electric discharge is effected between said wire electrode and said workpiece to machine said workpiece to have an arbitrary shape; and a suction mechanism comprising a plurality of suction conduits connected respectively to a plurality of holes in said workpiece communicating with machining grooves to be formed on said workpiece by said wire electrode, for removing undesirable matters including sludge from said machining grooves via said plurality of holes.

2. The wire electric discharge machining apparatus according to claim 1, further comprising a machining tank for storing a working fluid to immerse said workpiece therein, wherein said suction mechanism removes said undesirable matters together with said working fluid.

3. The wire electric discharge machining apparatus according to claim 1, further comprising a working fluid supply mechanism for supplying a working fluid to an electric discharge machining site on said workpiece or vicinity thereof, wherein said suction mechanism removes said undesirable matters together with said working fluid.

4. The wire electric discharge machining apparatus according to claim 1, wherein said suction mechanism includes:

a plurality of cylindrical members for being inserted into said plurality of holes; and a holding member for holding said plurality of cylindrical members.

5. A wire electric discharge machining method, comprising the steps of:

feeding a wire electrode by using a wire-driving system while opposing said wire electrode to a workpiece;

supplying electric power to said wire electrode by using a power supply unit so that said electric discharge is effected between said wire electrode and said workpiece to machine said workpiece to have an arbitrary shape; and machining said workpiece while removing, by using a suction mechanism, undesirable matters including sludge, said suction mechanism comprising a plurality of suction conduits connected respectively to a plurality of holes in said workpiece communicating with machining grooves to be formed on said workpiece by said wire electrode.

6. The wire electric discharge machining method according to claim 5, wherein said undesirable matters are removed by using said suction mechanism together with a working fluid in which an electric discharge machining site on said workpiece is immersed.

\* \* \* \* \*